Dec. 7, 1954 W. W. CUSHMAN 2,696,198
ROTARY INTERNAL-COMBUSTION ENGINE
Filed Dec. 14, 1949 2 Sheets-Sheet 1

INVENTOR.
W. W. Cushman
BY
W. J. Eccleston
ATTORNEY

Dec. 7, 1954 — W. W. CUSHMAN — 2,696,198
ROTARY INTERNAL-COMBUSTION ENGINE
Filed Dec. 14, 1949 — 2 Sheets-Sheet 2
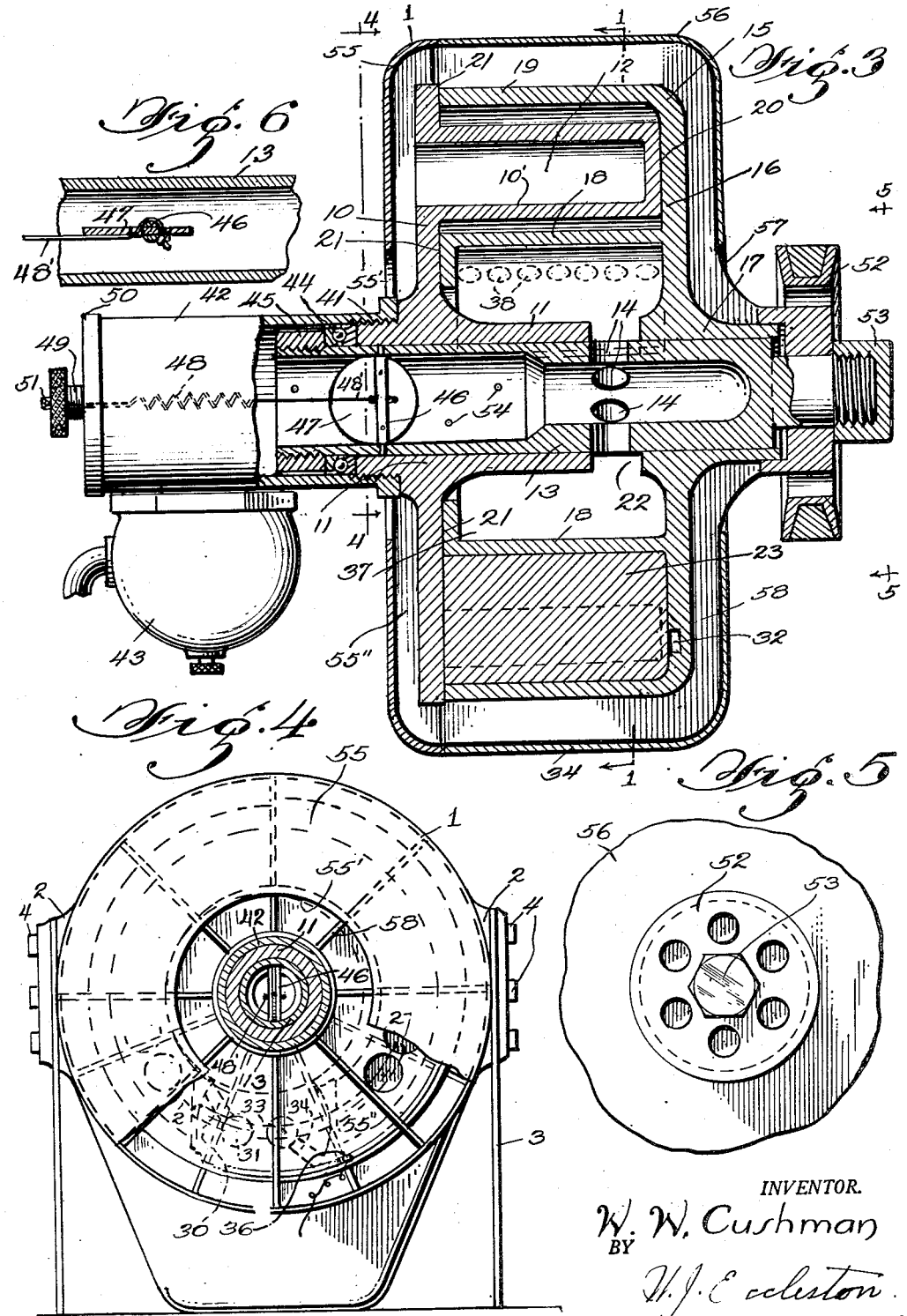
INVENTOR.
W. W. Cushman
BY
W. J. Eccleston
ATTORNEY

United States Patent Office 2,696,198
Patented Dec. 7, 1954

2,696,198

ROTARY INTERNAL-COMBUSTION ENGINE

Walton W. Cushman, Webb City, Mo.

Application December 14, 1949, Serial No. 132,961

12 Claims. (Cl. 123—16)

(Granted under Title 35, U. S. Code (1952), sec. 266)

The invention described herein, if patented, may be manufactured and used by or for the Government for governmental purposes, without the payment to me of any royalty thereon.

This invention relates to rotary internal combustion engines and has for its primary object to generally improve engines of this type.

More specifically it is an object of the invention to facilitate the intake of live gases and the discharge of exhaust gases by centrifugal force created by the operation of the engine itself, and with no additional devices, etc.

A further object of the invention resides in the provision of a rotary engine so designed as to function not only as an engine but also as a supercharger in supplying live gases to the combustion chamber.

Another object of the invention consists in providing a rotary engine of the type referred to in which most of the wear caused between the rotor and stator is automatically compensated for by the ordinary operation of the engine.

A still further object of the invention consists in the employment of an automatically operated governor which is controlled centrifugally in accordance with the R. P. M. of the rotor shaft throughout a wide range of operation and obviates the need for a conventional butterfly throttle.

Another object of the invention resides in the provision of a rotary engine in which the intake and compression chamber is smaller than the combustion and exhaust chamber thereby allowing the gases to expand more fully with a consequent increase in efficiency and a great reduction in noise such as ordinarily caused by the early release of exploding gases.

Another object of the invention consists in the construction of an engine of extremely light weight and of relatively few parts which may be released for disassembly by the mere removal of a single nut.

A further object of the invention resides in so designing a rotary internal combustion engine that maximum air cooling of the rotor and stator is provided for, thereby improving wear characteristics, and permitting the engine to operate at a compression ratio of approximately 11:1, and higher, thus providing greater efficiency of operation.

A still further object of the invention consists in the production of a rotary internal combustion so designed as to permit the use of a glow plug as the igniting means wherein no dependence is placed upon ignition timing, thus eliminating the expense, weight, and other complications involved in the use of conventional battery or magneto ignition systems.

A still further object of the invention is the provision of an engine having 2-cycle power with 4-cycle scavenging.

Other objects and advantages of the invention will be apparent from the following description taken in connection with the accompanying drawings, in which:

Figure 3 is a vertical sectional view taken on line 3—3 of Figure 1 (partly in elevation) and looking in the direction of the arrows;

Figure 4 is an end elevational view (partly in section) taken on the line 4—4 of Figure 3 and looking in the direction of the arrows;

Figure 5 is a fragmentary end view of the engine looking in the direction of the arrows 5—5 of Figure 3; and Figure 6 is a fragmentary sectional view of the butterfly valve and its operating spring.

Figures 1, 2:
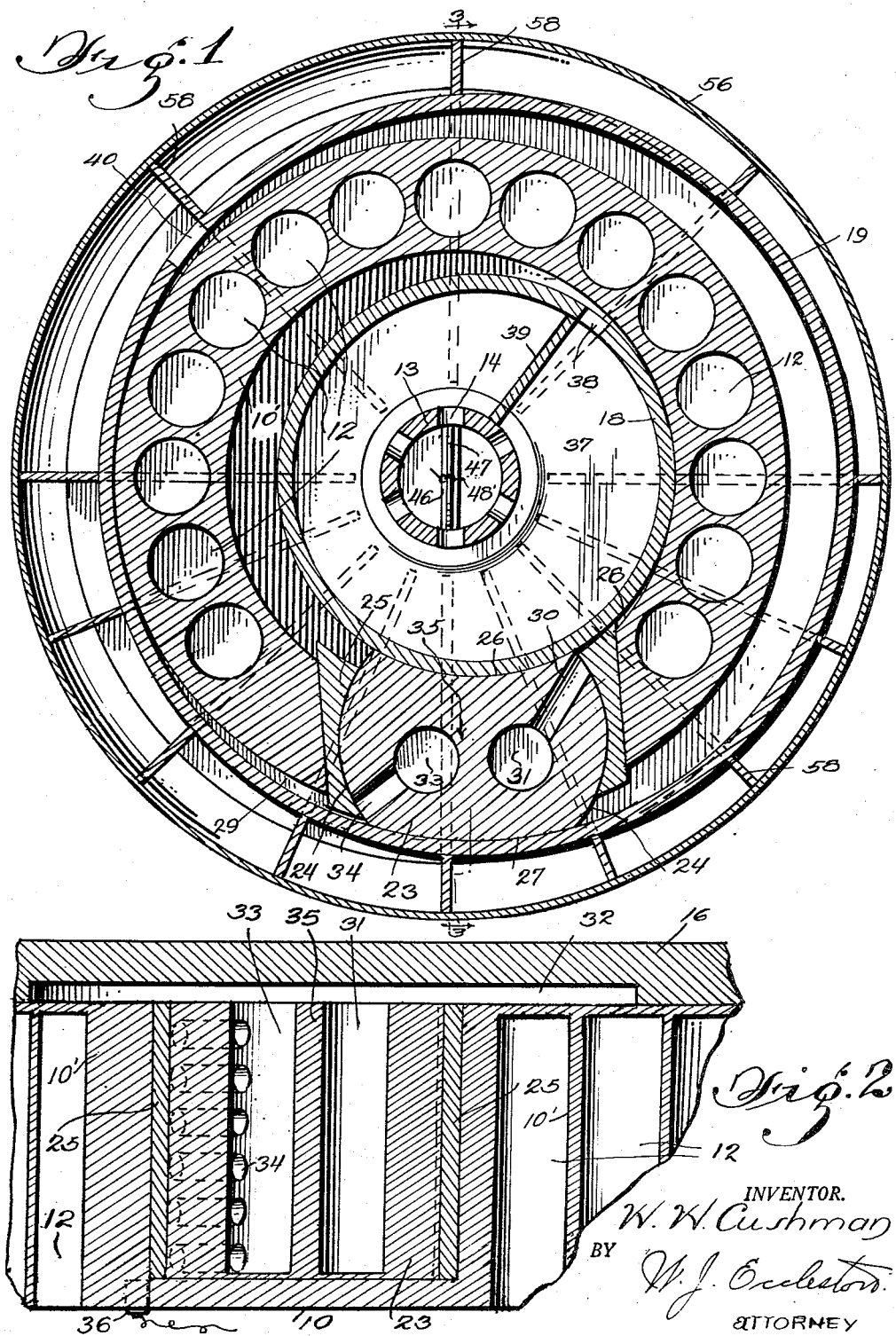
Figure 1 is a longitudinal sectional view through the rotary internal combustion engine taken on the line 1—1 of Figure 3.
Figure 2 is a fragmentary sectional view taken on line 2—2 of Figure 4.

In the present illustration of the rotary internal combustion engine the stator forms a part of the exterior casing and is of circular construction, and is indicated generally by the numeral 1. Provided on opposite edges of the stator is a pair of bosses 2, to which base members or supports 3 may be secured as by bolts 4 for supporting the engine on a base or the like; although it is to be understood that various conventional means may be employed for supporting the engine on a base or for suspending it by means of hangers.

The stator includes a disc-like casting 10, provided with a hollow bearing member 11, and provided also with a divider ring 10' having a series of recesses 12 to lighten the structure, and serving to provide lateral bearing surfaces for the rotor, as will appear hereinafter. The rotor is preferably formed of plated aluminum or other lightweight metal as is the stator, but cast iron has been successfully used on a hard steel shaft.

The shaft of this engine, in the present illustration is hollow and is indicated by the numeral 13. This shaft is rotatably mounted in the bearing 11 of the stator, and is provided with an annular series of openings 14, positioned just beyond the inner end of the bearing 11, so as to provide for the centrifugal discharge of live fuel into the interior of the engine as will appear later. Fixed to the outer end of the shaft 13, is the rotor 15, comprising a disc-portion 16, concentrically arranged on the shaft 13, as by means of the concentrically located hub 17. Integrally formed on the innerface of the concentric disc 16, but eccentrically thereof, are inner and outer relatively concentric sleeves 18 and 19 having a width corresponding to the width of the divider ring 10' on the stator 10, so that the innerface of the disc 16 bears against the adjacent edge of the divider ring as indicated at 20 and the free ends of the concentrically arranged sleeves 18 and 19 bear against the innerface of the disc-like portion of the stator 10, as indicated by numeral 21. There is thus provided a rotor having an annular hollow portion which cooperates with the stator or divider ring 10' to provide compression and combustion chambers as will later appear. It is to be noted that the hub 17, which is fixed to the rotary shaft 13, is of such length as to provide an annular space between it and the inner end of the bearing 11, so as to provide an annular passageway 22 for the exit of fuel through the openings 14 in the shaft.

The piston for the rotary engine is indicated by the numeral 23 and is provided with arcuate sides 24, adapted to be seated for oscillation in similarly curved bearing pads 25, which are mounted for reciprocation radially from the axis of rotation of the stator divider ring 10'. By means of the reciprocally movable bearing pads, the piston is allowed to oscillate and radially reciprocate to the extent required by the passage of the eccentrically arranged rotor, it being noted that the inner and outer faces 26 and 27 of the piston are curved to correspond to the curvature of the inner and outer sleeves of the rotor.

By reason of this eccentric mounting of the rotor it will be apparent that a combined induction and compression chamber 28 is provided as well as a combined combustion and exhaust chamber 29. To provide for the passage of compressed gases from the compression chamber 28 to the combustion chamber 29, the piston 23 may be provided with a plurality of passages 30, communicating at their outer ends with the compression chamber end at their inner ends with a pocket 31 extending transversely of the piston and opening into an arcuate transverse slot 32 provided on the innerface of the rotor 15. The piston 23 is also provided with a companion pocket 33 communicating with the inner ends of passages 34 formed at the opposite side and end of the piston and communicating with the combustion chamber 29. With this arrangement, the pocket 31 through the medium of the passageways 30, is always open to the reception of gases from the compression chamber, but such gases cannot be transferred from the pocket 31 to the pocket 33, and thence to the combustion chamber 29, until such time as the forward end of the arcuate slot 32 in the rotor passes the wall dividing these two pockets, such wall being indicated by the numeral 35. From the time that the front end of the slot 32 passes the dividing wall 35 between pockets 31 and 33 and until the trailing end of the slot passes beyond the pocket 31, the gases compressed in the compression chamber are forced into the combustion chamber 29. The gases are ignited at each revolution of the engine, and in this sense, this rotary engine is of the two-cycle type, but in another sense, provides four-cycle performance with complete scavenging after each explosion. To ignite the gases periodically, during each revolution of the engine, a glow plug 36 is provided and is positioned as indicated (Fig. 2), so that the gases will not be fired in the combustion chamber until after the trailing end of the transfer slot 32 passes the partition 35 in the piston 23, thereby avoiding any possibility of the flames being carried into the compression chamber. In other words, the glow plug will be exposed to the live gases only when the rotor has moved around to such point that the adjacent part of the sleeve 19 passes below the plug so that the latter is actually within the combustion chamber. The timing of the engine may be controlled therefore by varying the radial position of the plug.

As already indicated, the fuel entering the hollow shaft is thrown by centrifugal force through the openings 14, into the interior of the rotor as defined by the inner sleeve 18, and generally indicated by the numeral 37. This inner sleeve 18 is provided with a plurality of openings 38, extending through its wall and just behind these openings a combined scoop and impeller 39 may be provided for imparting a highly turbulent whirling action to the gases passing through the openings 14, and thereby causing them to be thrown by centrifugal force through the openings 38 into the induction and compression chamber 28. At relatively high speeds the gases may be thrown through the openings 38 by such centrifugal force as to provide an intake charge having a pressure greater than atmospheric. Also, at relatively slow speed, the gases are inducted into the chamber 28 by the vacuum created therein, the amount of centrifugal force at such speed being relatively slight. Because of this centrifugal force, the engine is supercharged in the sense that the pressure of the gases forced into the chamber 28 is above atmospheric pressure, depending upon the speed. The outer sleeve 19 is provided with a series of exhaust openings 40, through which the exhaust gases are discharged also by centrifugal force tending to reduce the noise, and eliminate all back pressure on the exhaust stroke. While the exhaust gases are shown as directed into the cooling air jacket it is to be noted that the high velocity of the cooling air is capable of readily carrying off the exhaust gases thereby avoiding any material rise in temperature within the jacket.

Threaded to the left-hand end (Figure 3) of the hub of the stator 10, as indicated by numeral 41, is the manifold 42, to which the carburetor 43 is connected. Also associated with the outer end of the hub of the stator 10 is a thrust-bearing 44, held in position by a nut 45, threaded to the outer end of the hollow shaft 13, and it is to be noted that this nut is threaded onto the shaft in a direction opposite to the direction of rotation of the rotor so that the inertia of the nut will serve to draw the rotor into closed relationship to the disc-like element 10 of the stator thereby automatically taking up any wear caused by the frictional engagement in the bearing surfaces 20 and 21 (Figure 3). Mounted for pivotal movement within the shaft 13, as by means of pin 46, is a butterfly valve 47. In the specific construction illustrated the pin 46 is longitudinally slotted (Figure 6) and the valve 47 is disposed in the slot so that its center is at one side of the pin. A tension spring 48 has an elongated portion 48' extended through the center of the valve and is then secured to the valve in the manner indicated. By this construction any whipping action of the spring which might otherwise be caused by the rotation of the shaft, is avoided. The spring 48 extends through the manifold 42 and the outer end of the spring passes through a central opening in a bolt 49, which is threaded into the closed end 50 of the manifold 42. The outer end of the spring means 48 may be provided with a cone-bearing 51 so that it may readily rotate with respect to the bolt 49 as the hollow shaft 13 is rotated during the operation of the engine. The tension of the spring means 48 is so applied to the pin 46 and butterfly valve 47 as to normally bias the valve to open position, and the centrifugal force caused by the rotation of the shaft tends to move the valve 47 to closed position so that the valve and related parts act as a governor to maintain the engine at a predetermined speed. By adjusting the bolt 49 the amount of tension applied to the pin and butterfly valve may be varied so as to vary the speed of the engine, as desired. The opposite end of the rotary shaft 13 is solid and may have applied thereto a pulley 52 or other power take-off means. In the present illustration, the pulley 52 by means of a keyway or similar device serves to interlock the rotary hub 17 with the shaft 13 and a nut 53 is threadedly connected to this end of the shaft to maintain these elements in interlocked relationship.

That portion of the rotary shaft 13, which is inclosed by the bearing 11 may be provided with oil holes or the like 54, which may be supplied from any suitable source, as is the thrust-bearing 44. One method of supplying oil to the moving parts consists in the use of a moderate amount of oil contained in the air and gasoline mixture passing into the interior of the rotary shaft, and this oil automatically finds its way through the oil apertures 54 to the several parts requiring lubrication.

The engine illustrated herein is air cooled and for this purpose the stator 10 is provided with a casing 55 having an air outlet 55', while the rotor 15 is provided with a casing 56 fixed to rotate therewith and this casing as well as the casing 55 serve to provide air passages around such elements. The casing 56 is provided with an annular entrance opening 57 and a series of fins or vanes 58 are mounted between the body of the rotor 15 and the inner wall of the casing 56, and these vanes serve as impellers in drawing large quantities of air through the annular opening 57. Likewise, the casing 55 is provided with radially extending fins or vanes 55''. The air entering the casing between the vanes 58 passes about the outer surface of the rotor and about the disk-like portion 10 of the stator and thence out through the discharge opening 55' in the casing 55. It will thus be seen that provision is made for pumping large quantities of cooling air entirely about the exterior of the engine, so as to maintain it at a relatively low temperature. Internal cooling is effected by the incoming gases.

The operation of the engine has been fairly well described in connection with the description of the several parts thereof. It may be well, however, to briefly describe a complete cycle of operation of the several elements as they relate to each other. Assuming that the screw bolt 49 has been adjusted to produce the desired tension in the spring means 48 so as to cause the governor 47 to maintain the engine speed at the desired R. P. M., and electric current sent through the glow plug 36, the engine may be started in any preferred manner such as a coiled rope associated with the shaft 13 or by a blank cartridge placed in the combustion chamber 29.

The rotation of the rotor about the stator causes the formation of the induction and compression chamber which is somewhat smaller than the combustion chamber, thus allowing for more complete expansion of gases prior to the discharge of the exhaust to the atmosphere. The unburned gases are drawn by suction through the openings 14 over the shaft 13 into the compartment 37 which is encircled by the sleeve 18 of the rotor. From thence the gases are drawn through the openings 38 of the sleeve 18 into the compression chamber 28 of the engine. The continued rotation of the rotor decreases the size of the chamber, thus applying pressure to the gases prior to their transfer and entrance into the combustion chamber 29. These compressed gases pass into passageways 30 of the piston 23 and into the pocket 31 thereof. However the transfer of the compressed gases to the combustion chamber 29 cannot take place until the leading end of the transfer slot 32 passes the partition 35 between the two pockets 31 and 33. As soon as the leading end of the slot 32 passes the partition 35 the gases pass into the combustion chamber 29 and continue to be forced into this chamber until such time as the trailing end of the transfer slot 32 arrives at the partition 35. Communication between the combustion chamber 29 and the fuel chamber 37 is automatically cut off at this point because of the position of the rear end of the slot 32 with respect to the partition 35, and it is at this point that the glow plug is exposed to the gases and explodes or burns them within the chamber 29. It is the expansion of these gases which acts against the relatively fixed piston 23 and related parts of the stator and rotor to give a torque impulse to the rotor. As the speed of the engine increases the centrifugal force caused by its rotation progressively and gradually closes the valve-governor 47 until the engine stabilizes at a speed for which the spring 48 is adjusted. During this increased speed of the engine centrifugal force comes into play to augment the suction heretofore referred to and throws the gases through the openings 14 of the shaft 13, and additional centrifugal force is applied to the gases by reason of the whirling action imparted to them by the rotation of the sleeve 18 and the whirling action may be increased by the employment of the scoop-impeller 39. The gases will thus be forced out through the outlets 38 into the induction and compression chamber 28, and as heretofore referred to are then forced into the combustion chamber at pressures substantially above atmospheric. The exhaust gases pass out through openings 40 in the sleeve 19, and their passage is augmented by centrifugal force. Since there is only a very small reversal in the mass of moving parts, and a major portion of the mass continues to rotate in the same direction, and for the further reason that combustion takes place at a time when the combustion chamber is being enlarged or expanded very rapidly, relatively high compression ratios have been used (11:1) without detonation. This cycle of operation is of course rapidly repeated throughout the continuation of the operation of the engine.

From the foregoing description taken in connection with the accompanying drawings, it will be apparent to those skilled in the art that I have provided a rotary internal combustion engine of extremely light weight and simplicity of construction, the latter being due to the use of the nut 45 which serves to automatically take up a portion of the wear between moving parts; that the seal at these points becomes increasingly improved as wear takes place; that the engine itself acts as a supercharger in injecting charges into the combustion chamber; that the throttle valve, due to its progressive operation by centrifugal force, serves as a governor for maintaining the engine at the desired speed; that noise is reduced to a minimum by reason of the fact that the combustion chamber is larger than the compression chamber and the fact that exhaust gases are expelled by centrifugal force; that four-cycle scavenging is provided in an engine having two-cycle power; that adequate air cooling of the engine is provided by reason of the arrangement of the casings and impeller vanes or ribs; that by reason of the use of the glow plug as the igniting means, the expense and complications involved in the use of conventional battery or magneto circuits is eliminated; and that by reason of this highly efficient cooling, and the enlargement of the combustion chamber when combustion is taking place, the non-reversal of moving parts, the engine may be operated at a compression ratio of 11:1 and higher.

No claim is made in this application to the governor or speed control mechanism as this feature is claimed in my divisional application Serial No. 201,669, filed December 19, 1950, now Patent No. 2,582,236.

In accordance with the patent statutes, I have described that I now consider to be the preferred form of the invention, but inasmuch as various changes may be made in the details of construction such as the manner of introducing the gases into the chamber 37 etc., it is intended that all such changes be included within the scope of the appended claims.

I claim:

1. A rotary internal combustion engine including a stator, a radially movable piston extending through one portion of the stator, a rotor eccentrically mounted with respect to the stator and including inner and outer walls in engagement with the inner and outer walls of the piston to provide two variable chambers, said piston provided with an interrupted passageway leading from one side of the stator to the other, and said rotor provided with a groove to intermittently connect said interrupted passageway.

2. A rotary internal combustion engine including a stator, a radially movable piston extending through one portion of the stator, a rotor eccentrically mounted with respect to the stator and including inner and outer walls in engagement with the inner and outer walls of the piston, a web connecting the inner and outer walls of the rotor and provided with an arcuate groove on its inner side, said piston provided with a pair of pockets opening toward the grooved side of said web, and said piston provided with passageways leading from the inner side of the stator to one pocket and from the other pocket to the outer side of the stator.

3. A rotary internal combustion engine including a stator, a radially movable piston extending through one portion of the stator, a rotor eccentrically mounted with respect to the stator and including inner and outer walls in engagement with the inner and outer walls of the piston to provide an induction and compression chamber and a combustion chamber, a web connecting the inner and outer walls of the rotor and provided with an arcuate groove on its inner sde, said piston provided with a pair of pockets opening toward the grooved side of said web, and said piston provided with passageways leading from the induction and compression chamber to one pocket and from the other pocket to the combustion chamber.

4. A rotary internal combustion engine including a stator and an eccentrically-mounted rotor for cooperation therewith, external casings encircling the rotor and stator respectively and in spaced relation thereto, the casing for said rotor being mounted to rotate therewith and provided with an inlet opening, and the stator casing being provided with outlet openings.

5. A rotary internal combustion engine including a stator and an eccentrically-mounted rotor for cooperation therewith, external casings encircling the rotor and stator respectively and in spaced relation thereto, the casing for said rotor being mounted to rotate therewith, and provided with an inlet opening, radially-extending vanes fixed to the interior of the rotor casing, and the stator casing being provided with an outlet opening.

6. A rotary internal combustion engine including a shaft, a stator and a rotor, said stator comprising a disc-like plate, a divider ring mounted concentrically of said plate, and a bearing member disposed at the center of the plate and receiving said shaft, said rotor comprising a disc-like portion provided with a concentrically disposed hub fixed to the shaft, inner and outer concentrically arranged sleeves spaced apart a distance greater than the thickness of the divider ring and having a width corresponding to that of the divider ring, the diameters of the sleeves being such as to receive the divider ring therebetween, said sleeves being eccentrically mounted with respect to the divider ring.

7. A rotary internal combustion engine including a shaft, a stator and a rotor, said stator comprising a disc-like plate, a divider ring mounted concentrically of said plate, a bearing member disposed at the center of the plate and receiving said shaft, said rotor comprising a disc-like portion provided with a concentrically disposed hub fixed to the shaft, inner and outer concentrically arranged sleeves spaced apart a distance greater than the thickness of the divider ring and having a width corresponding to that of the divider ring, the diameters of the sleeves being such as to receive the divider ring therebetween, said sleeves being eccentrically mounted with respect to the divider ring, and a piston means mounted for radial movement in the divider ring for cooperation with said eccentrically mounted sleeves.

8. A rotary internal combustion engine including a shaft, a stator and a rotor, said stator comprising a disc-like plate, a divider ring mounted concentrically of said plate, a bearing member disposed at the center of the plate and receiving said shaft, said rotor comprising a disc-like portion provided with a concentrically disposed hub fixed to the shaft, inner and outer concentrically arranged sleeves spaced apart a distance greater than the thickness of the divider ring and having a width corresponding to that of the divider ring, the diameters of the sleeves being such as to receive the divider ring therebetween, said sleeves being eccentrically mounted with respect to the divider ring, and a piston means mounted for radial movement in the divider ring, said piston means having a radial dimension corresponding to the distance between sleeves, the inner and outer faces of the piston means having a curvature corresponding to that of the inner and outer sleeves.

9. A rotary internal combustion engine including a shaft, a stator and a rotor, said stator comprising a disc-like plate, a divider ring mounted concentrically of said plate, a bearing member disposed at the center of the plate and receiving said shaft, said rotor comprising a disc-like portion provided with a concentrically disposed hub fixed to the shaft, inner and outer concentrically arranged sleeves spaced apart a distance greater than the thickness of the divider ring and having a width corresponding to that of the divider ring, the diameters of the sleeves being such as to receive the divider ring therebetween, said sleeves being eccentrically mounted with respect to the divider ring, and a piston means mounted for radial movement in the divider ring for cooperation with said eccentrically mounted sleeves, said piston means provided with passageways permitting the passage of gases from one side thereof to the other in certain positions of the rotor.

10. A rotary internal combustion engine including a shaft, a stator and a rotor, said stator comprising a disc-like plate, a divider ring mounted concentrically of said plate, a bearing member disposed at the center of the plate and receiving said shaft, said rotor comprising a disc-like portion provided with a concentrically disposed hub fixed to the shaft, inner and outer concentrically arranged sleeves spaced apart a distance greater than the thickness of the divider ring and having a width corresponding to that of the divider ring, the diameters of the sleeves being such as to receive the divider ring therebetween, said sleeves being eccentrically mounted with respect to the divider ring, and a piston means mounted for radial movement in the divider ring for cooperation with said eccentrically mounted sleeves, said piston means and the rotor provided with passageways permitting the passage of gases from one side of the piston means to the other in certain positions of the rotor.

11. A rotary internal combustion engine including a shaft, a stator and a rotor, said stator comprising a disc-like plate, a divider ring mounted concentrically of said plate, a bearing member disposed at the center of the plate and receiving said shaft, said rotor comprising a disc-like portion provided with a concentrically disposed hub fixed to the shaft, inner and outer concentrically arranged sleeves spaced apart a distance greater than the thickness of the divider ring and having a width corresponding to that of the divider ring, the diameters of the sleeves being such as to receive the divider ring therebetween, said sleeves being eccentrically mounted with respect to the divider ring, and a piston means mounted for radial movement in the divider ring for cooperation with said eccentrically mounted sleeves, said piston means provided with passageways for the transfer of gases from one side thereof to the other, the inner face of the disc-like portion of the rotor provided with an arcuate groove cooperating with the divider ring and the piston means to control said transfer of gases.

12. A rotary internal combustion engine including a shaft, a stator and a rotor, said stator comprising a disc-like plate, a divider ring mounted concentrically of said plate, a bearing member disposed at the center of the plate and receiving said shaft, said rotor comprising a disc-like portion provided with a concentrically disposed hub fixed to the shaft, inner and outer concentrically arranged sleeves spaced apart a distance greater than the thickness of the divider ring and having a width corresponding to that of the divider ring, the diameters of the sleeves being such as to receive the divider ring therebetween, said sleeves being eccentrically mounted with respect to the divider ring, a piston means mounted for radial movement in the divider ring for cooperation with said eccentrically mounted sleeves, said piston means provided with passageways for the transfer of gases from one side thereof to the other, the inner face of the disc-like portion of the rotor provided with an arcuate groove cooperating with the divider ring and the piston means to control said transfer of gases, and a glow plug so mounted as to ignite the transferred gases when the arcuate groove has reached a point at which passageways through the piston means are closed.

References Cited in the file of this patent

UNITED STATES PATENTS

| Number | Name | Date |
|---|---|---|
| 813,819 | Ostrander | Feb. 27, 1906 |
| 822,347 | Clark | June 5, 1906 |
| 865,206 | Ranck | Sept. 3, 1907 |
| 912,332 | Thompson | Feb. 16, 1909 |
| 1,209,204 | Richards | Dec. 19, 1916 |
| 1,253,716 | Palmer | Jan. 15, 1918 |
| 1,899,374 | Werle | Feb. 28, 1933 |